(12) United States Patent
Gong et al.

(10) Patent No.: US 11,203,860 B2
(45) Date of Patent: Dec. 21, 2021

(54) COMBINATION WATER OUTLET DEVICE AND TOILET

(71) Applicant: Bestter (Xiamen) Technology Inc., Xiamen (CN)

(72) Inventors: Binhua Gong, Xiamen (CN); Guotong Li, Xiamen (CN); Mingjian Cai, Xiamen (CN); Shengdong Lin, Xiamen (CN)

(73) Assignee: Bestter (Xiamen) Technology Inc., Xiamen (CN)

( * ) Notice: Subject to any disclaimer, the term of this patent is extended or adjusted under 35 U.S.C. 154(b) by 0 days.

(21) Appl. No.: 16/902,231

(22) Filed: Jun. 15, 2020

(65) Prior Publication Data
US 2020/0392715 A1 Dec. 17, 2020

(30) Foreign Application Priority Data

Jun. 14, 2019 (CN) .......................... 201910516886.8

(51) Int. Cl.
*E03D 9/08* (2006.01)
*F16K 15/03* (2006.01)

(52) U.S. Cl.
CPC .............. *E03D 9/08* (2013.01); *F16K 15/035* (2013.01)

(58) Field of Classification Search
CPC ........................................................ E03D 9/08
USPC ................................. 4/420.4, 420, 447, 448
See application file for complete search history.

(56) References Cited

U.S. PATENT DOCUMENTS

2008/0092283 A1* 4/2008 Cruz ...................... E03D 9/085
4/420.4

* cited by examiner

*Primary Examiner* — Lori L Baker
(74) *Attorney, Agent, or Firm* — Cooper Legal Group, LLC (57) ABSTRACT

A combination water outlet device and a toilet are provided. The combination water outlet device comprises a housing, and a spray pipe. The housing is disposed with an inlet and an outlet. The outlet surrounds the spray pipe, the spray pipe comprises a pipe body, a nozzle, and a valve port. At least two water passages are disposed in the pipe body. The nozzle is disposed on a first end of the spray pipe configured to extend out of the housing, and the valve port is disposed on a second end of the spray pipe. The valve port comprises at least two first water inlet holes and at least two valve flaps. The at least two valve flaps are respectively configured to close the at least two first water inlet holes. The inlet comprises at least two water inlet passages and at least two check valves.

14 Claims, 6 Drawing Sheets

COMBINATION WATER OUTLET DEVICE AND TOILET

RELATED APPLICATIONS

This application claims priority to Chinese Patent Application 201910516886.8, filed on Jun. 14, 2020. Chinese Patent Application 201910516886.8 is incorporated herein by reference.

FIELD OF THE DISCLOSURE

The present disclosure relates to a combination water outlet device and a toilet.

BACKGROUND OF THE DISCLOSURE

Existing buttock and bidet washing devices (non-intelligent cover plates) in the market all use separate pipes to control the corresponding water outlet. There are three shortcomings. First, when the buttock washing and bidet washing are switched, the water outlet does not change quickly and it takes some time for the other nozzle to extend. Second, when the buttock washing and bidet washing are arranged in parallel, the jetting point of the water outlet is not at the center axis of the human body, which is not ergonomic. Third, when the buttock and bidet washing are switched repeatedly, the self-cleaning water is repeatedly discharged, which causes waste of water resources.

BRIEF SUMMARY OF THE DISCLOSURE

The present disclosure provides a combination water outlet device and a toilet intended to solve deficiencies of the existing techniques.

In order to solve the aforementioned technical problems, a first technical solution of the present disclosure is as follows.

A combination water outlet device comprises a housing and a spray pipe. The housing comprises an inlet and an outlet. The outlet surrounds the spray pipe, and the spray pipe comprises a pipe body, a nozzle, and a valve port. At least two water passages are disposed in the pipe body. The nozzle is disposed on a first end of the spray pipe configured to extend out of the housing, and the valve port is disposed on a second end of the spray pipe. The valve port comprises at least two first water inlet holes and at least two valve flaps. The at least two first water inlet holes are respectively connected to the at least two water passages, and the number of the at least two valve flaps is selected based upon the number of the at least two first water inlet holes. The at least two valve flaps are respectively configured to close the at least two first water inlet holes. First ends of the at least two valve flaps are pivotally connected to the valve port, and second ends of the at least two valve flaps extend to an outer periphery of the spray pipe to define convex portions. The inlet is disposed on a side wall of the housing. The inlet comprises at least two water inlet passages and at least two check valves, and the at least two water inlet passages are respectively in communication with the at least two check valves. Piston rods are movably disposed in water outlet ends of the at least two water inlet passages. Elastic members are disposed between the piston rods and the water outlet ends, and end portions of the piston rods are configured to extend to movement tracking lines of the convex portions.

In a preferred embodiment, a reset element is disposed between the spray pipe and the housing.

In a preferred embodiment, the housing further comprises a water inlet cover. The water inlet cover covers the inlet, and the water inlet cover comprises at least two second water inlet holes respectively connected to the at least two water inlet passages.

In a preferred embodiment, the housing further comprises an end cover, and the end cover covers and is sealed to a first end of the housing.

In a preferred embodiment, the housing further comprises a baffle board, and the baffle board divides the housing into an outer pipe and an inner cavity. The outer pipe is connected to the inner cavity through the end cover. The inlet is disposed on a side wall of the outer pipe of the housing. The spray pipe is disposed in the inner cavity, and the baffle board is disposed with one or more through holes configured to enable the end portions of the piston rods to pass through.

In a preferred embodiment, the reset element is a spring, and the spring surrounds an outer periphery of the pipe body of the spray pipe.

In a preferred embodiment, the valve port further comprises a self-cleaning water stopping sealing ring. The self-cleaning water stopping sealing ring surrounds the outer periphery of the spray pipe, and a diameter of an end of the inner cavity adjacent to the outlet reduces to a value not greater than an outer diameter of the self-cleaning water stopping sealing ring.

In a preferred embodiment, the piston rods move along axes of the at least two water inlet passages. The piston rods each comprises a piston plane and an end portion, and the piston planes are selected based upon sizes of inner diameters of water outlet ends of the at least two water inlet passages. The elastic members are disposed between the piston planes and the water outlet ends, and the end portions extend in a direction from the piston planes to the water outlet ends.

In a preferred embodiment, water inlet ends of the at least two check valves are respectively connected to the at least two water inlet passages disposed above the piston planes.

In a preferred embodiment, the valve port comprises one or more limiting devices, and the one or more limiting devices are respectively configured to control a maximum opening angle of the at least two valve flaps.

In a preferred embodiment, the one or more limiting devices comprise one or more hooks, and the one or more hooks are respectively disposed in an opening direction from the valve port to the convex portion of the at least two valve flaps. Inner walls of the convex portions comprise clamping blocks. When the at least two valve flaps open to a maximum opening angle, the one or more hooks are respectively hooked with the clamping blocks to achieve positioning.

In a preferred embodiment, the at least two valve flaps each comprises a sealing pad configured to close a corresponding one of the at least two first water inlet holes.

In a preferred embodiment, the nozzle comprises at least two water outlet groups. Each of the at least two water outlet groups is connected to a different water passage of the at least two water passages in the pipe body, and the at least two water outlet groups are disposed along an extending-contracting direction of the nozzle.

A second technical solution of the present disclosure is as follows.

A toilet, comprises the combination water outlet device. The combination water outlet device is disposed in a central axis of a toilet seat body in a direction from adjacent to a water tank to away from the water tank.

Compared with existing techniques, the technical solution provided by the present disclosure has the following advantages.

First, two (or more) valve flaps and two or more first water inlet holes are disposed on a rear portion of the spray pipe. When the device switches the two or more first water inlet holes, different piston rods will be extended to trigger the corresponding valve port to open and enable water to flow.

Second, in the same housing, the spray pipe has two (or more) water passages corresponding to different water outlet groups, and the different water outlet groups (two or more) are disposed on the same spray pipe in a front to back direction, which is an ergonomic design.

3. The same spray pipe is used, so when the water outlet groups are switched, the position of the nozzles is concurrently changed. There is no need to wait for the extension of the nozzle, waste of self-cleaning water during the movement of the nozzle when the water outlet groups are switched is reduced, and water is saved.

BRIEF DESCRIPTION OF THE DRAWING

The present disclosure will be further described below with the combination of the accompanying drawings and the embodiments.

Among the drawings, arrows indicate directions of flowing water or water movement, 1—housing, 11—end cover, 12—inlet, 13—outlet, 14—baffle board, 2—spray pipe, 21—pipe body, 22—nozzle, 23—valve port, 231—valve flap, 232—rotation shaft, 233—hook, 3—water inlet cover, 31—second water inlet hole, 32—cover plate, 4—check valve, 5—piston rod, 51—piston plane, 6—elastic member, 7—self-cleaning water stopping sealing ring, 211—water passage, 235—first water inlet hole, 2311—sealing pad, 2312—convex portions, 121—water inlet passage, 52—end portion, 10—reset member, 15—outer pipe, 16—inner cavity, 236—limiting device, 2313—clamping blocks.

DETAILED DESCRIPTION OF THE EMBODIMENTS

Embodiment 1

Referring to FIGS. 1-8, a combination water outlet device of this embodiment comprises a housing 1 and a spray pipe 2.

The housing 1 comprises an inlet 12 and an outlet 13, and the outlet 13 surrounds a spray pipe 2.

The spray pipe 2 comprises a pipe body 21, a nozzle 22, and a valve port 23. Two water passages 211 are disposed in the pipe body 21. The nozzle 22 is disposed on a first end of the spray pipe 2 configured to extend out of the housing 1, and the valve port 23 is disposed on a second end of the spray pipe 2. The valve port 23 comprises two first water inlet holes 235 and two valve flaps 231, and the two first water inlet holes 235 are respectively connected to the two water passages 211. Although reference is made to there being two first water inlet holes 235, there may be another number of first water inlet holes 235, and the number of the valve flaps 231 is selected based upon the number the first water inlet holes 235. Each of the two valve flaps 231 comprises a sealing pad 2311 for closing a corresponding one of the two first water inlet holes 235. First ends of the two valve flaps 231 are pivotally connected to the valve port 23 (e.g., a first end of a first valve flap of the two valve flaps 231 and a first end of a second valve flap of the two valve flaps 231 are on a same side of the two valve flaps 231), and second ends of the two valve flaps 231 extend to an outer periphery of the spray pipe 2 to define convex portions 2312. In this embodiment, the first ends (e.g., bottoms) of the two valve flaps 231 are pivotally connected to the valve port 23 through a rotation shaft 232 (e.g., two ends of the rotation shaft), and the convex portions 2312 are disposed on the second ends (e.g., tops) of the two valve flaps 231.

The inlet 12 is disposed on a side wall of the housing 1, and the inlet 12 comprises two water inlet passages 121 (e.g., the two water inlet passages 121 are independent) and two check valves 4. The two water inlet passages 121 are respectively connected to the two check valves 4, and water outlet ends of the two water inlet passages 121 movably surround two piston rods 5. Two elastic members 6 are disposed between the two piston rods 5 and the water outlet ends, and an end of each of the two piston rods 5 extends to a movement tracking line of a corresponding one of the convex portions 2312. The two piston rods 5 move along axes of the two water inlet passages 121. The two piston rod 5 each comprises a piston plane 51 and an end portion 52. The piston planes 51 adapt sizes of inner diameters of the water outlet ends. The two elastic members 6 are disposed between the piston planes 51 and the water outlet ends, and the end portions 52 extend in a direction from the piston planes 51 to the water outlet ends. Water inlet ends of the two check valves 4 are respectively in communication with the two water inlet passages 121 disposed above the piston planes 51.

The nozzle 22 comprises two water outlet groups. Each of the two water outlet groups corresponds to one of the two water passages 211 in the pipe body 21, and the two water outlet groups are disposed along an extending-contracting direction of the nozzle 22.

In order to enable the spray pipe 2 to contract, a reset member 10 is disposed between the valve port 23 and the housing 1. The reset member 10 is a spring, and the spring surrounds an outer periphery of the pipe body 21 of the spray pipe 2.

The housing 1 further comprises a water inlet cover 3 and an end cover 11. The water inlet cover 3 is disposed on the inlet 12, and the water inlet cover 3 comprises two second water inlet holes 31 respectively in communication with the two water inlet passages 121 and a cover plate 32. In this embodiment, the cover plate 32 covers an edge (e.g., an upper portion) of the inlet 12, the two second water inlet holes 31 are disposed on an outer portion (e.g., an upper portion) of the cover plate 32, the two water inlet passages 121 and the two check valves 4 are disposed on an inner portion (e.g., a lower portion) of the cover plate 32, and an inside of the cover plate 32 (e.g., an inside of the cover plate 32 and the inlet 12) extends to enable the two check valves 4 to be respectively in communication with connections of the two second water inlet holes 31 and the two water inlet passages 121. The end cover 11 covers and is sealed to an end of the housing 1.

The housing 1 further comprises a baffle board 14 configured to divide the housing 1 into an outer pipe 15 and an inner cavity 16, and the outer pipe 15 is in communication with the inner cavity 16 at a position of the end cover 11. The inlet 12 is disposed on a side wall of the outer pipe 15 of the housing 1, the spray pipe 2 is disposed in the inner cavity 16, and the baffle board 14 is disposed with one or more holes configured to enable the end portions 52 of the two piston rods 5 to pass through.

The valve port 23 further comprises a self-cleaning water stopping sealing ring 7. The self-cleaning water stopping sealing ring 7 surrounds the outer periphery of the spray pipe 2, and a diameter of an end of the inner cavity 16 adjacent to the outlet 13 reduces to a value not greater than an outer diameter of the self-cleaning water stopping sealing ring 7, but is not less than a pipe diameter of spray pipe 2.

The valve port 23 comprise one or more limiting devices 236, and the one or more limiting devices 236 are configured to control opening degrees of the two valve flaps 231. The one or more limiting devices 236 comprise one or more hooks 233, which are disposed in an opening direction from the valve port 23 to the convex portion 2312 of the two valve flaps 231, and inner walls of the convex portions 2312 comprise clamping blocks 2313. When the two valve flaps 231 are opened to a maximum angle, the one or more hook 233 are respectively hooked with the clamping blocks 2313 to achieve positioning.

Figure 1:
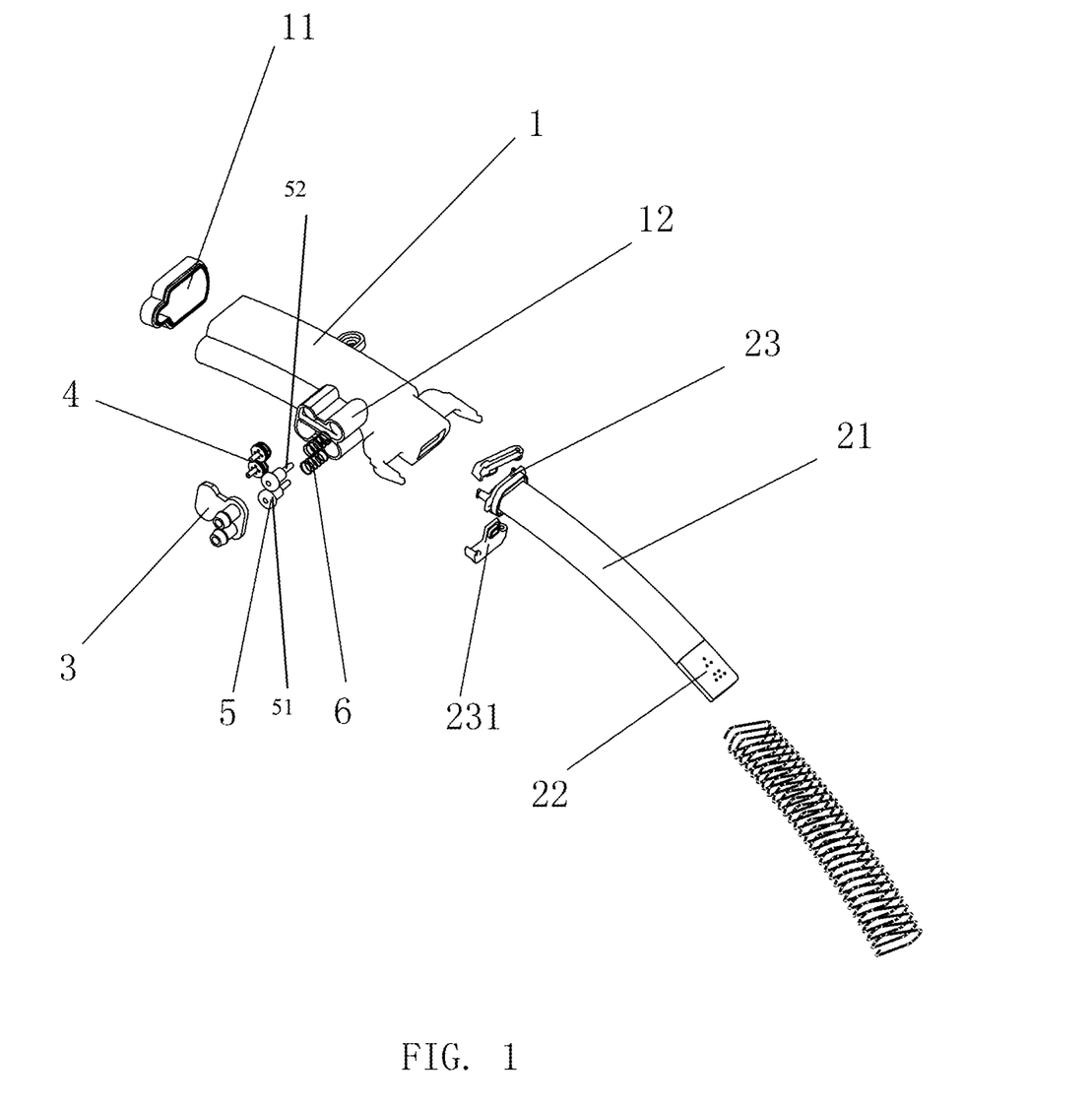
FIG. 1 is an exploded view of Embodiment 1.
Figure 2:
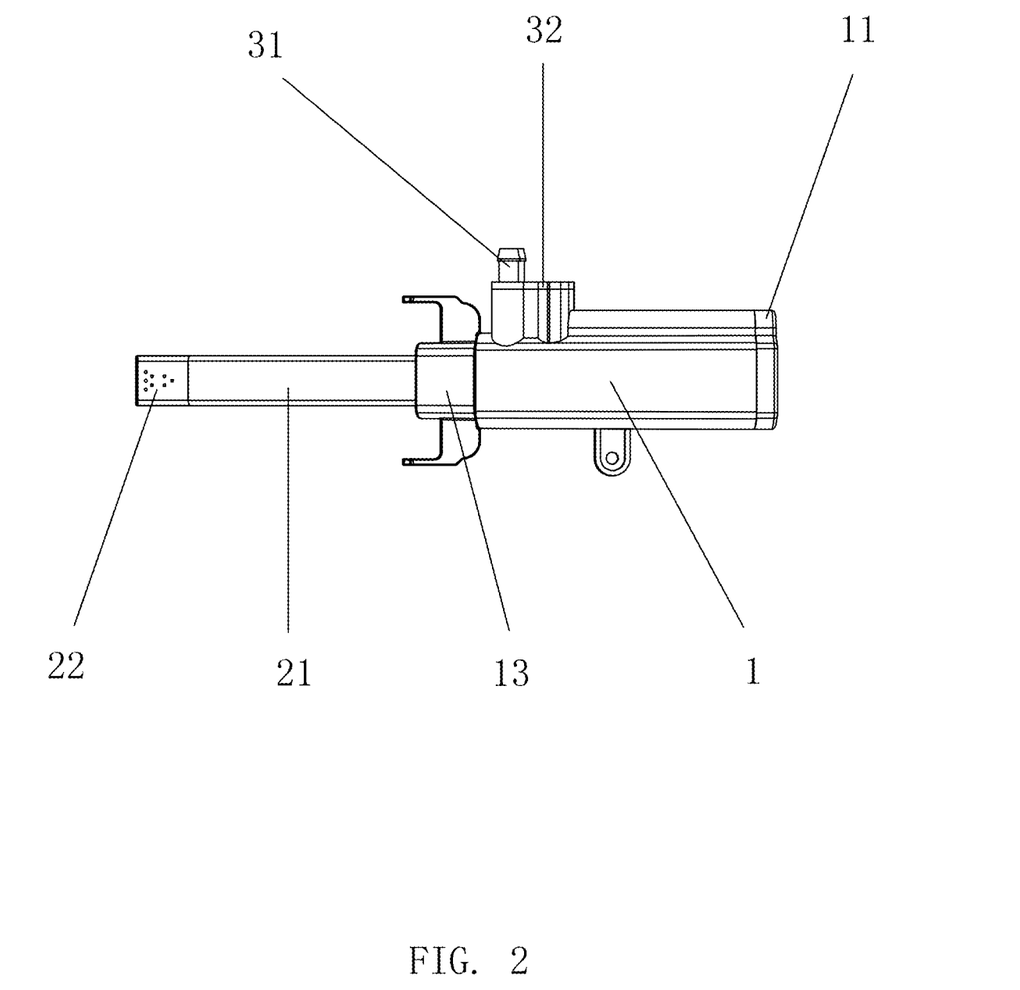
FIG. 2 is a first side view of Embodiment 1.
Figure 3:
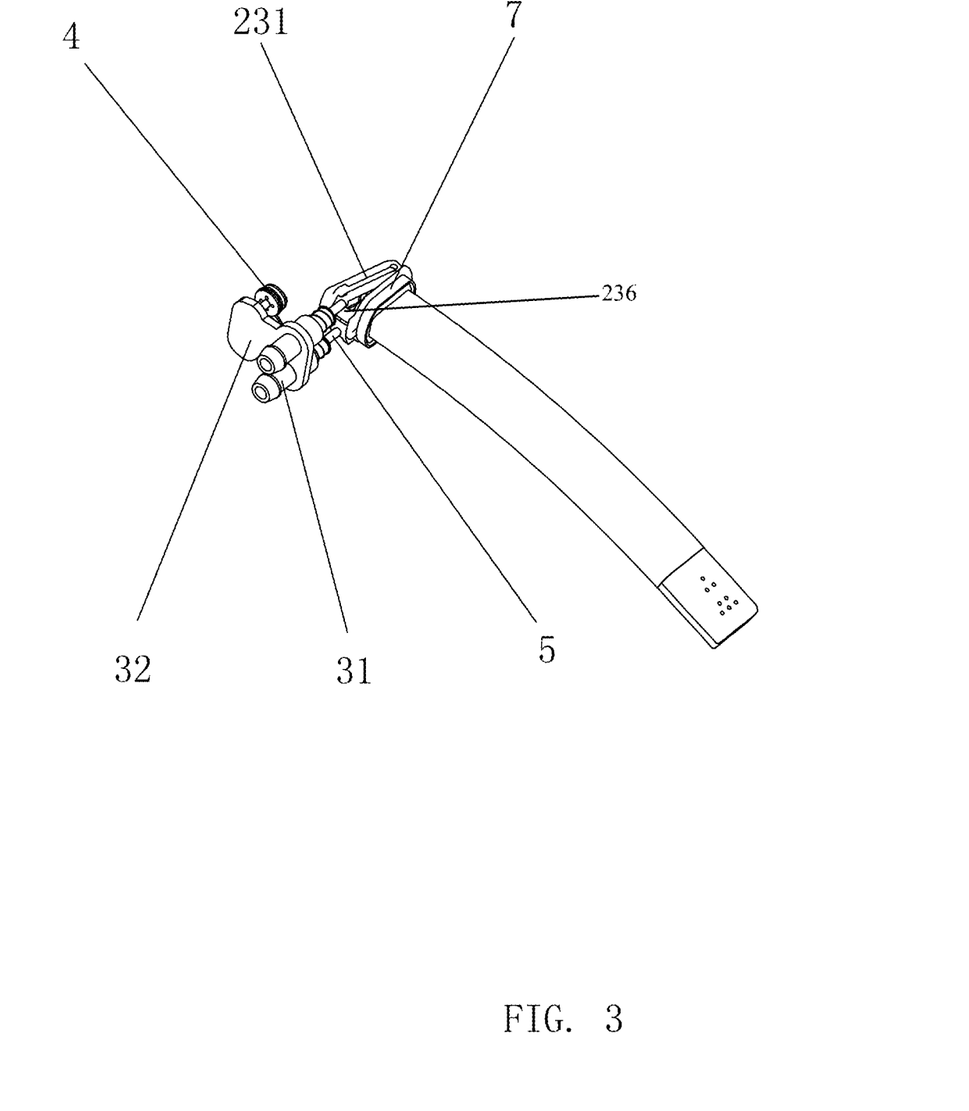
FIG. 3 is a perspective view of a positional relationship between a valve port and a piston rod of Embodiment 1.
Figure 4:
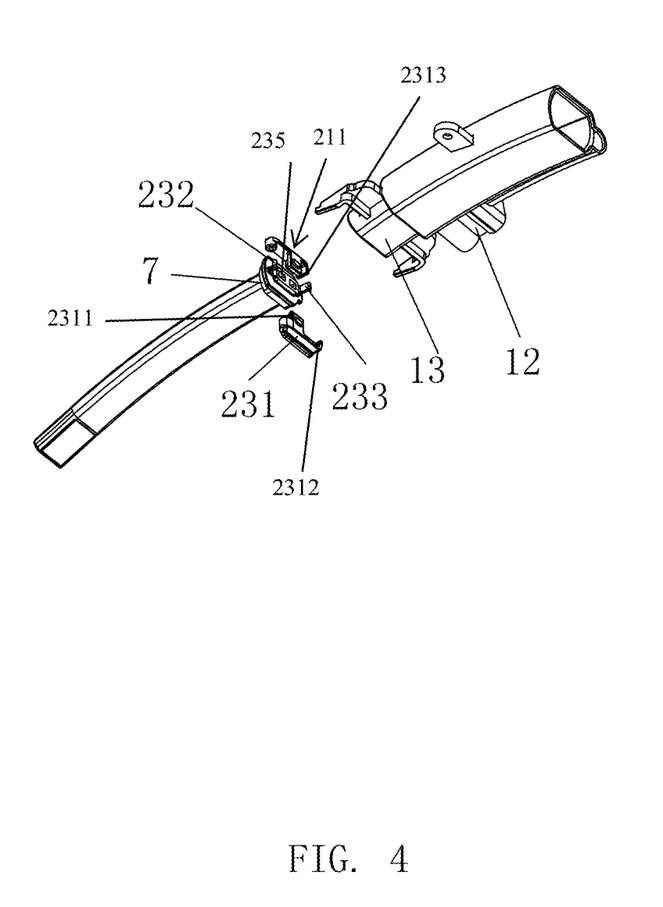
FIG. 4 is a perspective of Embodiment 1.
Figure 5:
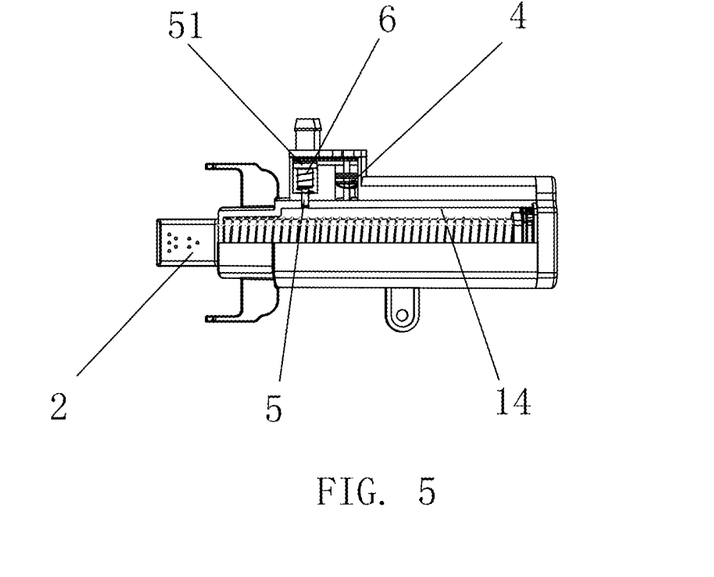
FIG. 5 is a cross-sectional view of Embodiment 1 in an initial state.

First, in an initial state, no water flows into the two second water inlet holes 31, the two elastic members 6 are not pressed by external forces, and the end portions 52 of the piston rods 5 are disposed in the one or more holes of the baffle board 14. The spray pipe 2 is disposed in the housing 1, the reset member 10 is in a natural state between the outlet 13 and the self-cleaning water stopping sealing ring 7, the valve port 23 is disposed on a position where the end cover 11 of the housing 1 is disposed, and the valve port 23 is in a closed state.

Figure 6:
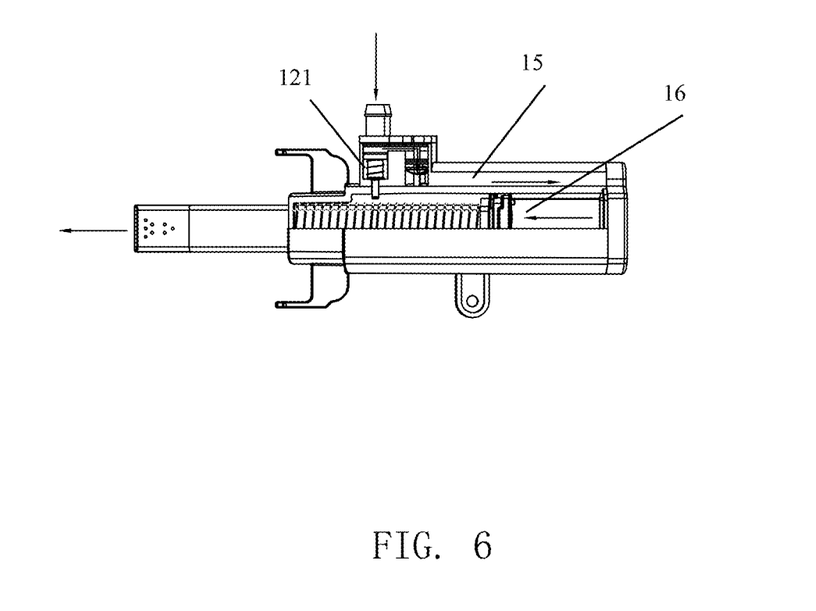
FIG. 6 is a cross-sectional view of Embodiment 1 when a spray pipe extends.

Second, when water flows into the two second water inlet holes 31 (e.g., one of the two second water inlet holes 31), the water reaches the cover plate 32, the piston planes 51 (e.g., one of the piston planes 51) are pressed (e.g., pressed downward) under an action of water pressure, the elastic members 6 (e.g., one of the elastic members 6) are pressed, and the end portions 52 of the piston rods 5 (e.g., an end portion 52 of one of the piston rods 5) extend out of the one or more holes of the baffle board 14 to reach the movement tracking line of the convex portions 2312 in the inner cavity 16. At the same time, because one of the piston planes 51 closes a corresponding one of the two water inlet passages 121, the water flows into a corresponding one of the two check valves 4 in an inner side of the cover plate 32, the outer pipe 15, and then the inner cavity 16 through the end cover 11. When the water fills the outer pipe 15 and the inner cavity 16, the spray pipe 2 is pushed outward to the outlet 13 of the housing 1 due to the water pressure. During a movement of the spray pipe 2, the water flows through a gap between the spray pipe 2 and the outlet 13 to define a self-cleaning water flow configured to clean the nozzle 22.

Figure 7:
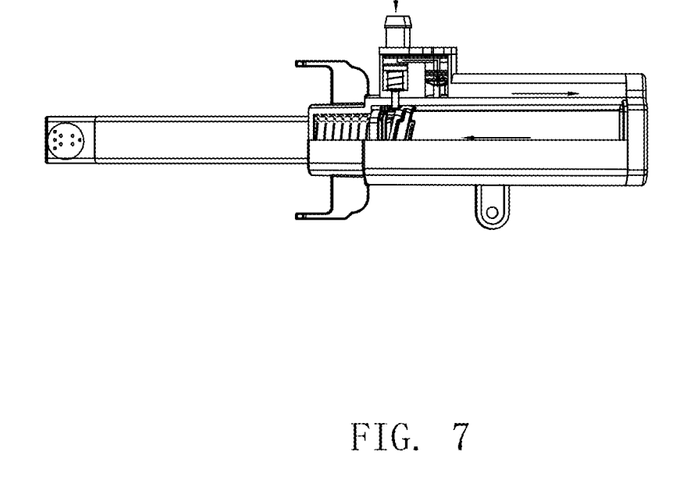
FIG. 7 is a cross-sectional view of Embodiment 1 in a water spray state.

Third, when the spray pipe 2 is pushed outward to a position of the piston rods 5, one of the convex portions 2312 of the two valve flaps 231 is blocked by a corresponding one of the end portions 52 of the piston rods 5. However, the spray pipe 2 still moves toward the outlet 13 so that a corresponding one of the two valve flaps 231 is opened, a corresponding one of the first water inlet holes 235 is exposed, and the water flows into a corresponding one of the two water passages 211 of the pipe body 21 through the first water inlet holes 235 and sprays out by a corresponding one of two water outlet groups. Further, when one of the two valve flaps 231 is opened to a certain angle, the hook 233 disposed on the valve port 23 is hooked to a corresponding one of the clamping blocks of the two valve flaps 231 to control a corresponding one of the two valve flaps 231 to maintain an opening angle. The spray pipe 2 continues to extend until the spray pipe 2 reaches a maximum extended position (e.g., the self-cleaning water stopping sealing ring 7 abuts a front side of the outlet 13) and the reset member 10 is pressed. At this time, the self-cleaning water stopping sealing ring 7 closes the outlet 13, a self-cleaning water flow stops, and only a corresponding one of the two water outlet groups of the spray pipe 2 discharges water.

Figure 8:
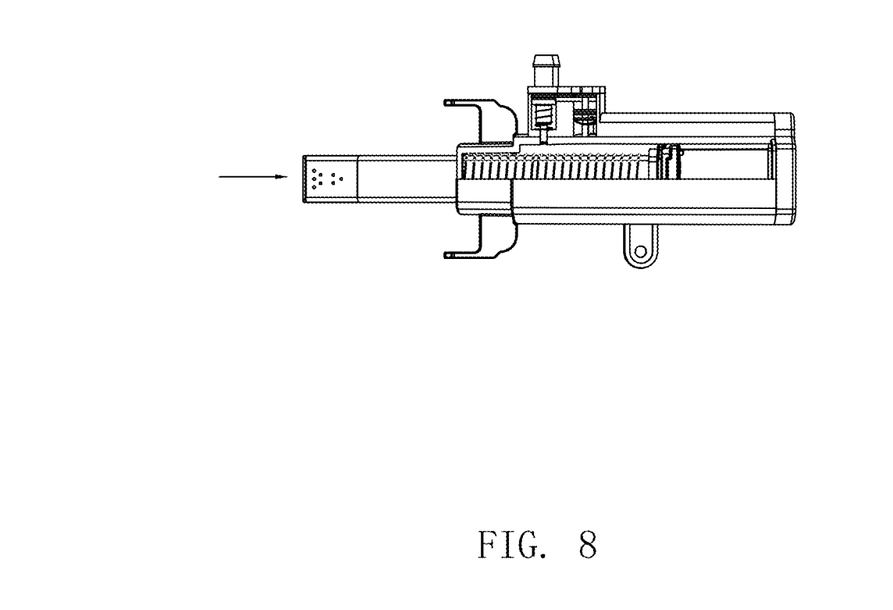
FIG. 8 is a cross-sectional view of Embodiment 1 when the spray pipe retracts.

Fourth, when the two second water inlet holes 31 are closed, no water flows into the two second water inlet holes 31, the piston rods 5 are reset, the two check valves 4 stop to discharge water, the spray pipe 2 retracts into the housing 1 under the action of the reset member 10, and the two valve flaps 231 are closed and reset to the initial state.

Embodiment 2

A toilet of this embodiment comprises the combination water outlet device of embodiment 1, and the combination water outlet device is disposed at a central axis of the toilet seat body in a direction from adjacent to a water tank to away from the water tank.

It will be apparent to those skilled in the art that various modifications and variation can be made in the present disclosure without departing from the spirit or scope of the invention. Thus, it is intended that the present disclosure cover the modifications and variations of this invention provided they come within the scope of the appended claims and their equivalents.

What is claimed is:
1. A combination water outlet device, comprising:
a housing, and
a spray pipe, wherein:
the housing comprises an inlet and an outlet,
the outlet surrounds the spray pipe,
the spray pipe comprises a pipe body, a nozzle, and a valve port,
at least two water passages are disposed in the pipe body,
the nozzle is disposed on a first end of the spray pipe configured to extend out of the housing,
the valve port is disposed on a second end of the spray pipe,
the valve port comprises at least two first water inlet holes and at least two valve flaps,
the at least two first water inlet holes are respectively connected to the at least two water passages,
the number of the at least two valve flaps is selected based upon the number of the at least two first water inlet holes,
the at least two valve flaps are respectively configured to close the at least two first water inlet holes,
first ends of the at least two valve flaps are pivotally connected to the valve port, second ends of the at least two valve flaps extend to an outer periphery of the spray pipe to define convex portions, the inlet is disposed on a side wall of the housing, the inlet comprises at least two water inlet passages and at least two check valves, the at least two water inlet passages are respectively in communication with the at least two check valves, piston rods are movably disposed in water outlet ends of the at least two water inlet passages, elastic members are disposed between the piston rods and the water outlet ends, and end portions of the piston rods are configured to extend to movement tracking lines of the convex portions.

2. The combination water outlet device according to claim 1, wherein a reset element is disposed between the spray pipe and the housing.

3. The combination water outlet device according to claim 2, wherein:

the reset element is a spring, and the spring surrounds an outer periphery of the pipe body of the spray pipe.

4. The combination water outlet device according to claim 1, wherein:

the housing further comprises a water inlet cover, the water inlet cover covers the inlet, and the water inlet cover comprises at least two second water inlet holes respectively connected to the at least two water inlet passages.

5. The combination water outlet device according to claim 1, wherein:

the housing further comprises an end cover, and the end cover covers and is sealed to a first end of the housing.

6. The combination water outlet device according to claim 1, wherein:

the housing further comprises a baffle board, the baffle board divides the housing into an outer pipe and an inner cavity, the outer pipe is connected to the inner cavity through an end cover, the inlet is disposed on a side wall of the outer pipe of the housing, the spray pipe is disposed in the inner cavity, and the baffle board is disposed with one or more through holes configured to enable the end portions of the piston rods to pass through.

7. The combination water outlet device according to claim 6, wherein:

the valve port further comprises a self-cleaning water stopping sealing ring, the self-cleaning water stopping sealing ring surrounds the outer periphery of the spray pipe, and a diameter of an end of the inner cavity adjacent to the outlet reduces to a value not greater than an outer diameter of the self-cleaning water stopping sealing ring.

8. The combination water outlet device according to claim 1, wherein:

the piston rods move along axes of the at least two water inlet passages, the piston rods each comprises a piston plane and an end portion, the piston planes are selected based upon sizes of inner diameters of the water outlet ends, the elastic members are disposed between the piston planes and the water outlet ends, and the end portions extend in a direction from the piston planes to the water outlet ends.

9. The combination water outlet device according to claim 8, wherein water inlet ends of the at least two check valves are respectively connected to the at least two water inlet passages disposed above the piston planes.

10. The combination water outlet device according to claim 1, wherein:

the valve port comprises one or more limiting devices, and the one or more limiting devices are respectively configured to control maximum opening angles of the at least two valve flaps.

11. The combination water outlet device according to claim 10, wherein:

the one or more limiting devices comprise one or more hooks, the one or more hooks are respectively disposed in an opening direction from the valve port to the convex portions of the at least two valve flaps, inner walls of the convex portions comprise clamping blocks, and when the at least two valve flaps open to a maximum opening angle, the one or more hooks are respectively hooked with the clamping blocks to achieve positioning.

12. The combination water outlet device according to claim 1, wherein the at least two valve flaps each comprises a sealing pad configured to close a corresponding one of the at least two first water inlet holes.

13. The combination water outlet device according to claim 1, wherein:

the nozzle comprises at least two water outlet groups, each of the at least two water outlet groups is connected to a different water passage of the at least two water passages in the pipe body, and the at least two water outlet groups are disposed along an extending-contracting direction of the nozzle.

14. A toilet, comprising:

the combination water outlet device according to claim 1, wherein:

the combination water outlet device is disposed in a central axis of a toilet seat body in a direction from adjacent to a water tank to away from the water tank.

* * * * *